United States Patent [19]

Bergen

[11] 3,951,533

[45] Apr. 20, 1976

[54] COLOR IMAGE REPRODUCTION SYSTEM

[75] Inventor: Richard F. Bergen, Ontario, N.Y.

[73] Assignee: Xerox Corporation, Stamford, Conn.

[22] Filed: Sept. 20, 1974

[21] Appl. No.: 507,911

[52] U.S. Cl. .......... 353/31

[51] Int. Cl.[2] .......... G03B 21/00

[58] Field of Search .......... 353/121, 122, 31, 84, 353/65

[56] References Cited

UNITED STATES PATENTS

| | | | |
|---|---|---|---|
| 3,273,999 | 9/1966 | Clark | 353/121 |
| 3,582,202 | 6/1971 | Donald | 353/31 |
| 3,627,408 | 12/1971 | Fergason | 353/84 |
| 3,716,359 | 2/1973 | Sheridon | 96/1.1 |
| 3,836,243 | 9/1974 | Melchior | 353/122 |

*Primary Examiner*—Harry N. Haroian
*Attorney, Agent, or Firm*—James J. Ralabate; David C. Petre; Gaetano D. Maccarone

[57] ABSTRACT

A color image reproduction system wherein there are recorded at different angular orientations on an imaging member at least two images respectively corresponding to the color content of at least two different colors of an original image. Readout illumination provided by an extended light source is converted to a plurality of point sources, directed upon the imaging member and the information-modulated illumination passed through appropriate light filters to provide a reproduction of the original image at an output image plane.

4 Claims, 6 Drawing Figures

COLOR IMAGE REPRODUCTION SYSTEM

BACKGROUND OF THE INVENTION

This invention relates to a color image reproduction system and, more particularly, to a system wherein images recorded by an imaging member are read out with illumination from an extended light source.

There is known in the art a class of imaging members wherein a photoconductive layer and an elastically deformable layer are sandwiched between a pair of electrodes, one of which may be a thin flexible metallic layer overlying the elastomer layer. In operation imagewise activating electromagnetic radiation is directed upon the member and an electrical field is established across the photoconductive and elastomer layers thus causing these layers to deform in imagewise configuration. These members may be used as image intensifiers since the deformation image may then be read out with a high intensity light source and a schlieren optical system or for buffer storage of images since the images may be stored for some period of time. A family of imaging devices of this type is described in U.S. Pat. No. 3,716,359.

There has now been developed a color imaging system wherein there is utilized an imaging member of the type described in the '359 patent which further includes color spatial light modulation means and a fiber optic element. This color imaging system is described in copending Application, Ser. No. 507,910, filed on even date herewith in the name of Richard F. Bergen and assigned to a common assignee. The entire contents of this copending Application are hereby incorporated by reference herein. There is disclosed a readout scheme for full color readout wherein a point or small source readout light source is used. These small sources generally include an arc lamp or small filament bulbs. The former requires a relatively expensive power supply and large lamphouse and the latter typically has low output intensity.

Since an extended light source such as a slide projector lamp produces considerable intensity using standard voltage it would be an attractive candidate for a readout light source. However, the large area filament of such a light source would require a much higher carrier frequency for the imaging member to provide separation of the zero order from the diffracted orders in the Fourier plane of the readout lens. This in turn would typically require larger and more expensive readout optics and much more expensive color gratings. It would be desirable to have a readout optics system which includes an extended light source which does not have the above-noted disadvantages.

OBJECTS OF THE INVENTION

It is, therefore, an object of this invention to provide the above-described desirable features.

It is another object of the invention to provide a color image reproduction system.

It is a further object to provide an image reproduction system capable of providing a full color reproduction of a full color original image.

It is still another object to provide an image reproduction system wherein an imaged member is read out with illumination provided by an extended light source and converted to a plurality of point sources.

Still further it is an object to provide an image reproduction system which includes a deformation imaging member.

BRIEF SUMMARY OF THE INVENTION

These and other objects and advantages are accomplished in accordance with the present invention by providing a color image reproduction system wherein there are recorded at different angular orientations on an imaging member at least two images respectively corresponding to the color content of at least two different colors of an original image. Readout illumination provided by an extended light source is converted to a plurality of point sources and directed upon the imaged member. The information-modulated illumination is then passed through appropriate light filters to provide a reproduction of the original image at an output image plane.

BRIEF DESCRIPTION OF THE DRAWINGS

For a better understanding of the invention as well as other objects and further features thereof, reference is made to the following detailed description of various preferred embodiments thereof, taken in conjunction with the accompanying drawings wherein.

DESCRIPTION OF THE PREFERRED EMBODIMENTS

Figure 1:
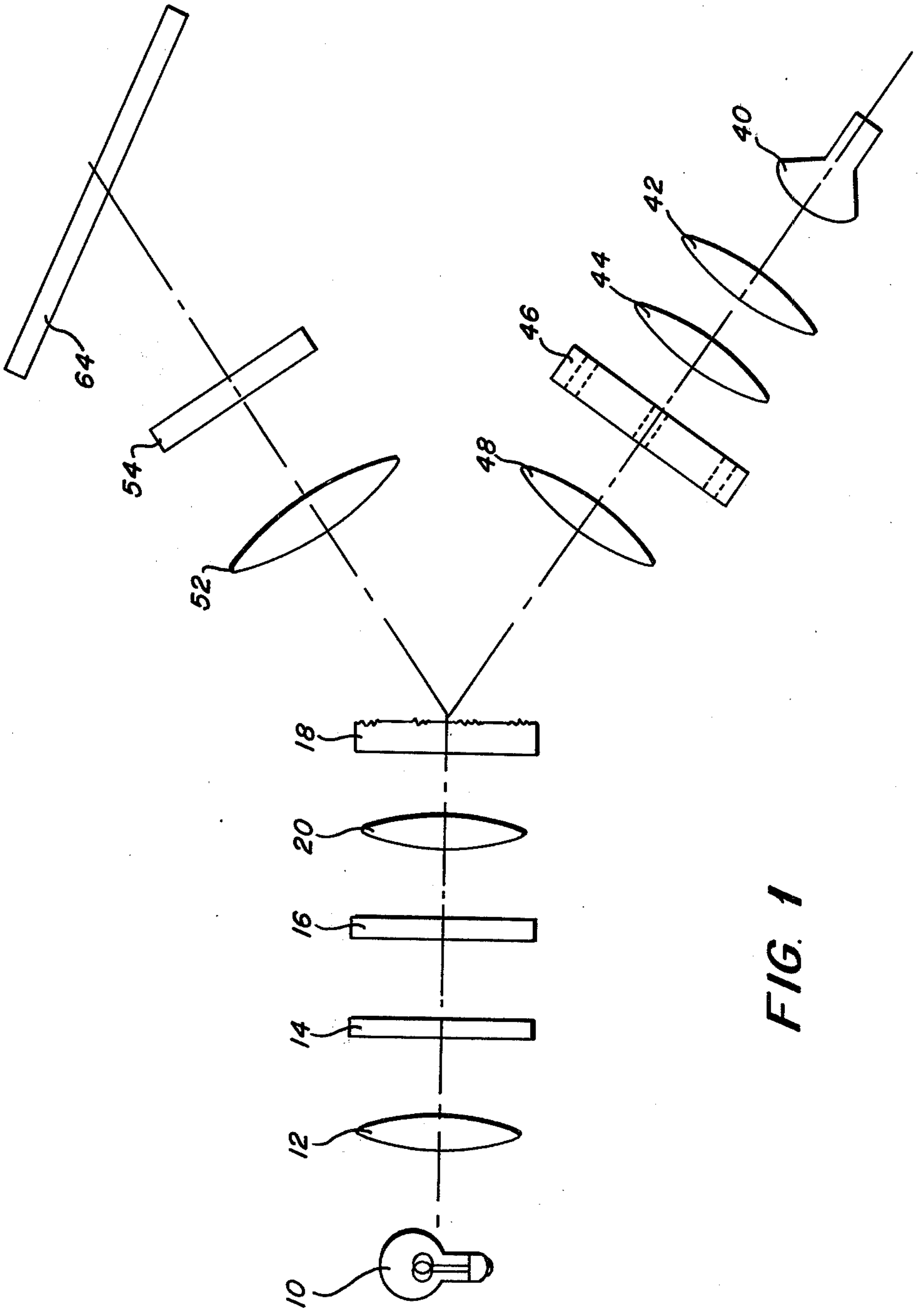
FIG. 1 is a schematic illustration of an embodiment of the color imaging system of the invention.
Figure 2:
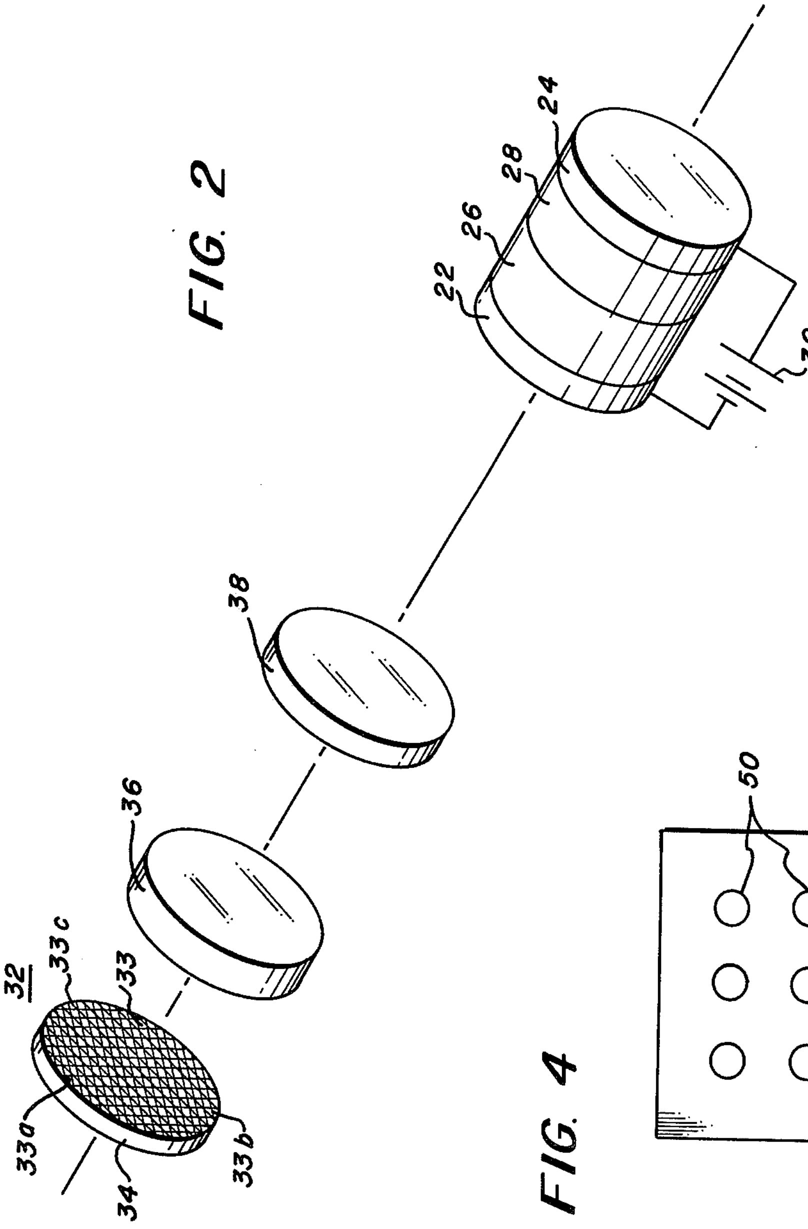
FIG. 2 is an exploded isometric view of an embodiment of an imaging member which may be used in the color imaging system.

In FIG. 1 there is illustrated an embodiment of a color imaging system wherein a multicolor optical image is provided by readin light source 10, lens 12, optional color correction filter 14 and color transparency 16. The optical image is directed upon imaging member 18 through lens 20. Generally imaging member 18 may be any which is capable of recording color screened image input. A preferred embodiment of an imaging member which may be used is shown in FIG. 2 wherein the individual elements are greatly magnified for purposes of illustration. Referring now to FIG. 2 there is seen an imaging member wherein a substantially transparent conductive layer 22 comprises one electrode of the member and a thin flexible conductive metallic layer 24 comprises another electrode. It should be noted that the imaging member may further include an optional transparent substrate for conductive coating 22. Sandwiched between the electrodes are photoconductive insulating layer 26 and deformable elastomer layer 28. The electrodes are connected to potential source 30 which may be A.C., D.C. or combinations thereof. It should be noted that the photoconductive material may be incorporated in elastomer layer 28 thus obviating the need for layer 26. The imaging member further includes color spatial light modulation means 32 comprising in this illustrative instance a three color grating 33 residing on a transparent substrate 34, e.g., glass, optional index matching liquid layer 36 and fiber optic element 38. Optionally and preferably there may also be provided a transparent layer of an insulating liquid for example, oil, (not shown) in contact with the free surface of flexible conductive layer 24. The insulating liquid layer serves an important function when it has an index of refraction different from that of air since its presence over flexible conductive layer 24 means light propagating from the right of the member for reading out the image formed therein will be modulated more than it would if only air were present. The insulating liquid layer also serves as protection for flexible conductive layer 24 by isolating it from contamination by dust or the like, maintaining a more constant, ambient environment. Typically, a protective layer (not shown) such as a cover glass is arranged over the insulating liquid to keep it in place and free of contamination.

Many materials of the types useful in layers 22, 24, 26 and 28 are known in the art (see, for example, U.S. Pat. No. 3,716,359) and therefore any extensive discussion of materials is not required.

Fiber optic element 38 comprises a plurality of light conducting optical fibers secured together in side by side relation so that corresponding opposite ends of the fibers cooperate to define first and second faces and may be electrically insulating or conductive. The member is typically about one-fourth inch thick and typically contains fibers in the range of from about 3 microns to about 20 microns in average diameter. The fibers may be of a variety of shapes including rod-like, thread-like, conical, etc. The fibers may be clad with a variety of materials including a dark colored material which will absorb light escaping from the fibers into the cladding and materials which are non-light absorbing. In one embodiment some of the fibers may have a single cladding of light absorbing material and the remainder of the fibers have a single cladding of non-absorbing material as is disclosed in U.S. Pat. No. 3,797,910. There are available fiber optic members which will transmit ultraviolet radiation; typically these members transmit visible and near infrared radiation. It is noted that a slightly reduced image contrast may be obtained because of the cladding.

The color spatial light modulation means 32 comprises a three color grating 33 residing on transparent substrate 34. The color grating is made up of three differently colored sets of stripes 33*a*, 33*b*, and 33*c* at different angular orientations superimposed on each other. Each differently colored set of stripes has a periodicity which may be the same as, or different than, the other sets of stripes. It should be noted that the color gratings may have only two sets of stripes. For purposes of illustration it will be considered that the vertical stripes 33*a* are magenta, the horizontal stripes 33*b* are cyan and the yellow stripes 33*c* are at an angle of 45° to the magenta and cyan stripes. For the elastomer layers typically used in imaging member 18 gratings having a periodicity of 40 lp/mm or 100 lp/mm are preferably used.

Arranged between color spatial light modulation means 32 and fiber optic element 38 is optional index matching liquid layer 36. Layer 36 does away with any air gap which would cause resolution losses and which would typically be present unless special precautions were taken such as, for example, using pressure to force the fiber optic element into intimate contact with substrate 34. Accordingly, the use of layer 36 is preferred. Layer 36 is chosen so as to have an index of refraction which is relatively close or equal to that of substrate 34 (typically glass) and the glass of the fiber optic bundles (typically about 1.5–1.75) Layer 36 generally has a thickness which is less than the periodicity of the gratings (for example, a 40 lp/mm grating has a period of 25 microns) and preferably is as thin as possible, for example, about 1 to 2 microns. Generally, any suitable liquid which has an appropriate index of refraction may be used in layer 36. Typical suitable liquids include for example, alcohols, oils such as 200 Dielectric Fluid available from Dow Corning, water, soaps such as glycerine and index matching liquids available from Cargille Lab., Inc., Cedar Grove, N.J.

Figures 3, 5:
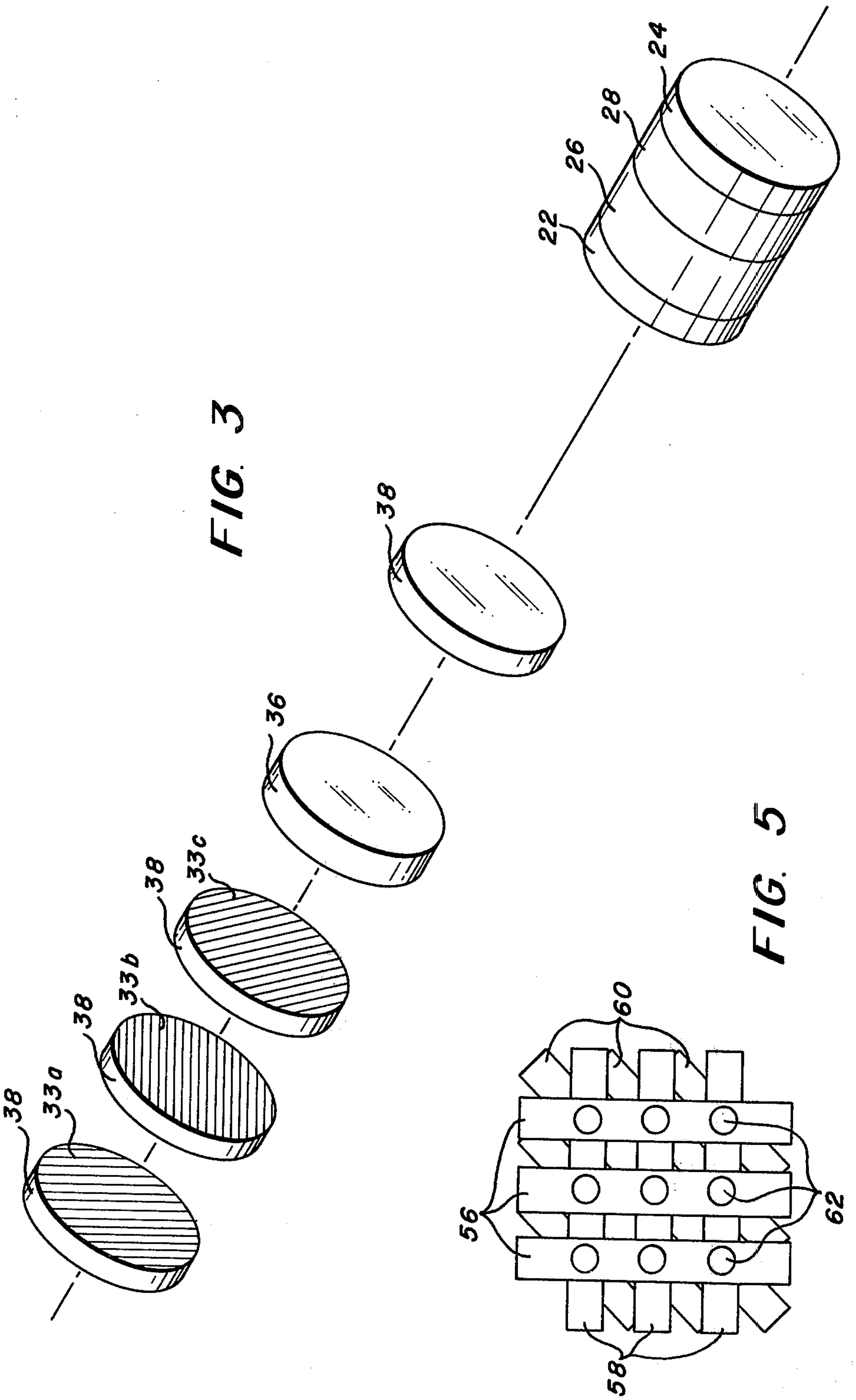
FIG. 3 is an exploded isometric view of another embodiment of an imaging member which may be used in the color imaging system.
FIG. 5 is a partially schematic front view of an embodiment of light filter means which may be used in the color imaging system.

Alternatively, the color gratings may be formed directly on a surface of the fiber optic element. In FIG. 3 there is shown in exploded isometric view an embodiment of an imaging member wherein a different set of stripes, for example, magenta stripes 33*a*, cyan stripes 33*b*, and yellow stripes 33*c*, respectively, resides on a separate fiber optic element 38. By using three separate fiber optic elements in the manner described it is possible to independently control the angular relationship of each color when the fiber optic elements are placed in contact with each other. Preferably an index matching layer is formed at the contact interfaces between each fiber optic element.

color gratings such as those shown in FIG. 3 may be formed in various ways including a technique utilizing a photoresist material. A layer of photoresist material is formed on a surface of a fiber optic element and a master line grating, for example, one having a periodicity of 40 lp/mm or 100 lp/mm is placed in contact with the photoresist material and the member is exposed. The unexposed portions of the photoresist layer are removed resulting in a line grating being formed on the surface of the fiber optic element. The strips of photoresist material are then dyed any desired color. In another embodiment a grating of one color may be formed on one surface of the fiber optic element and a second grating of a different color may be formed on the other surface thereof using the same techniques. Color gratings can also be made using "Polytran" commercially available from Eastman Kodak in cyan, magenta, yellow and black. This material can transfer an exposed image onto a heated substrate when a slight pressure is applied to the sandwich. The Polytran base is then stripped from the substrate leaving a high resolution grating image on the substrate.

Where the color gratings are affixed to the surface of the fiber optic element opposite from that carrying electrode 22, the imaging member may be utilized in a contact imaging mode wherein a transparency is placed in contact with the surface carrying the color gratings and subsequently illuminated to excite the photoconductive layer. In another contact printing embodiment the complex color grating may be disposed at the photoconductive layer-conductive layer interface and a transparency placed in contact with the surface of the fiber optic element opposite that carrying the conductive layer.

In operation of the imaging member an electrical field is established across the photoconductive layer 26 and elastomer layer 28 by applying a potential from source 30 to the electrodes. With the electrical field on an imagewise pattern of activating electromagnetic radiation is focused at the plane between the color grating and the bottom surface of fiber optic element 38. The electrical field induces a flow of charge in the regions of the photoconductive layer 26 which are exposed thus varying the field across elastomer layer 28. The mechanical force of the electrical field causes the elastomer layer 28 to deform in a pattern corresponding to the spatially modulated image information. The thin conductive layer 24 is sufficiently flexible to follow the deformation of elastomer layer 28. As aforesaid, any imaging member which is capable of recording screened color image information may be used in the inventive imaging system. Thus imaging member 18 may comprise, for example, any of the imaging members disclosed in U.S. Pat. No. 3,716,359.

Figure 4:
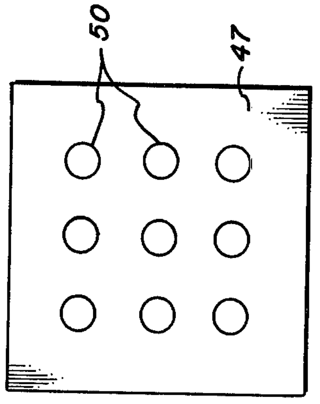
FIG. 4 is a partially schematic front view of an embodiment of a member which converts light from an extended light source into a plurality of point light sources.

The image formed in imaging member 18 is read out with illumination provided by extended light source 40. The illumination passes through condenser lenses 42 and 44 and subsequently passes through an aperture plate 46 which converts it to a series of point sources. The illumination is then directed upon imaging member 18 by collimating lens 48. One embodiment of an element for converting the illumination from extended light source 40 to a series of point sources is shown in FIG. 4. Referring to FIG. 4 there is seen an element comprising opaque substrate 47 with a plurality of apertures 50 which may be of any shape, for example, circular as illustrated, square, etc. For purposes of illustration the aperture plate is shown as having nine circular openings; however, it should be noted that there may be any number of openings in the plate and the optimum number is dependent, inter alia, upon the size of the extended light source. In the readout scheme of the present image reproduction system an image of the aperture plate 46 is formed at a plane located between the readout lens 52 and the projected image plane 64 where the reproduced optical image is focused. Typically, for imaging members which include color spatial light modulation means having periodicities of 40 lp/mm and a 3 inch focal length readout lens, the apertures may be ⅛ inch diameter or square on 5/16 inch centers.

The light reflected from imaging member 18 is collected by readout lens 52 and processed at the focal plane of lens 52 where there is positioned a light filter element 54. The apertures in plate 46 are imaged at the plane of the filter element 54. An embodiment of the light filter element 54 which may be used in the color imaging system is shown in FIG. 5. Referring to FIG. 5 there is seen light filter element 54 comprising in this illustrative instance, red filter strips 56, green filter strips 58, blue filter strips 60 and a plurality of opaque areas 62. The opaque areas 62 may be applied to the light filter element 54 or sufficiently opaque areas may be protected by the cumulative effect of the red, blue and green filter strips in overlapping areas. As aforesaid, the light filter element is arranged at the focal plane of readout lens 52. The opaque areas 62 are positioned to stop the zero order light reflected from the surface of the imaging member 18, that is, the light reflected from the non-deformed (background) areas of the imaging member. Accordingly, light filter element 54 must include as many opaque areas 62 as there are openings in the aperture plate 46. The opaque areas should be of sufficient size to intercept substantially all the zero order reflected light.

The diffracted light along any diffracted axis is made up of all the colors of light present in the readout illumination. Accordingly, to provide a color reproduction of the original image at image plane 64, appropriate light filter strips are provided at the appropriate angular orientation with respect to the angular orientation of the various color gratings (see FIG. 2) which were used to form the image in imaging member 18. For example, where the color grating was arranged in a vertical direction the image formed in the member because of the vertical color grating will provide a horizontal diffraction readout pattern. A color filter which is complementary to the vertical color grating used is arranged across the horizontal axis of the diffraction pattern provided by the image recorded because of the vertical color grating and will remove all the wavelengths from the readout illumination except those corresponding to the color of the filter thus giving the appropriate color content of the original scene at image plane 64. For example, in the embodiment described in FIG. 2 the vertically oriented color grating comprises magenta stripes 33*a*. An image corresponding to the green content of the original image is recorded by the imaging member because the magenta stripes absorb green and allow the remainder of the light to pass. Therefore, the green filter strips 58 arranged in the horizontal direction will allow the green color content of the original image to be formed at image plane 64. Similarly, an image corresponding to the red color content of the original image is recorded on the imaging member because of the horizontally arranged cyan grating 33*b* and red filter strips 56 arranged vertically give the red color content of the original image at image plane 64. Finally, an image corresponding to the blue content of the original image is recorded on the imaging member because of the yellow grating 33*c* and blue filter strips arranged in the appropriate direction give the blue color content of the original image at image plane 64. Thus there is formed at image plane 64 a full color reproduction of the color transparency 16.

It will be noted that in the series of filter strips which comprise light filter element 54 there is a space between each filter strip of each series. The space between the filter strips is a function of the focal length of the readout lens, the periodicity of the color gratings employed to record the various color contents of the original image in the imaging member, the size of the apertures in the element which converts illumination from an extended light source to a plurality of point sources, the angular relationship of the latter element to its optical axis and the relationship between the two optical axes involved in the color image reproduction system. The number of filter strips in each series is related to the angular orientation of that series as can be seen in FIG. 5.

In the embodiment illustrated the projected full color image will be a color reproduction of the original image, that is to say, red areas of the original will appear red in the projected image, etc. However, it should be noted that the color reproduction system of the invention may be practiced in other embodiments such as, for example, where a quasi color negative reproduction is obtained from a color positive original image or where a quasi color positive reproduction is obtained from a color negative original image. By "quasi color negative" or "quasi color positive" is meant that the reproduced image will display complementary colors for all corresponding color areas of the original with the exception of those areas of the original which are black, white or gray, in which case the reproduced image will display the same color as the corresponding areas of the original. For example, a white area on the original will appear white in the reproduced image, etc. Therefore, if cyan, magenta and yellow filters are used with the same color gratings a color positive-quasi color negative or color negative-quasi color positive imaging system can be provided. It should also be noted that the color gratings need not be an integral part of the imaging member. For example, a color grating may be placed in contact with the emulsion layer of an original transparency and subsequently an image of this combination focused upon the imaging member. The images will be recorded by the imaging member as described above.

Figure 6:
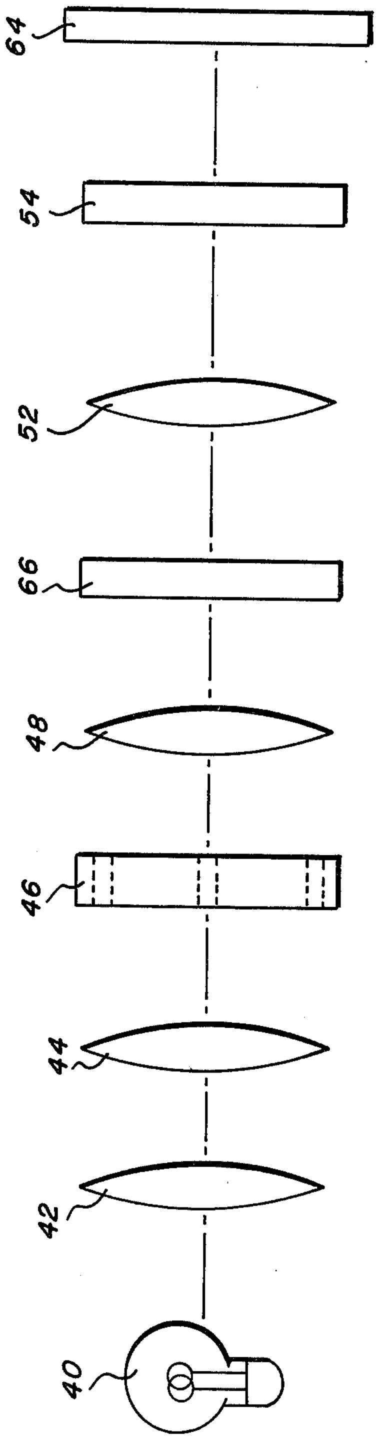
FIG. 6 is a schematic illustration of another embodiment of the color imaging system of the invention.

FIG. 6 illustrates an embodiment of the invention wherein the imaged member is read out in transmission. Imaging member 66 may comprise conventional black and white photographic film. Imaging member 66 may be exposed to an original multicolor image through a filter optic element carrying a complex color grating as has been described in detail. The fiber optic element is adjacent the film emulsion with a layer of index matching liquid arranged between them. In another embodiment a color grating may be placed in contact with the emulsion layer of an original transparency and an image of the combination focused upon the imaging member in which case the fiber optic element is not necessary. The film is then developed in the normal manner, i.e., the developed film appears dark where it was struck by light. In the film the images corresponding to the various color contents of the original image are arranged at various angular orientations as described above. The images are stored in the film in the form of diffraction gratings having densities proportional to the exposure. The developed film is then arranged in the readout system described in FIG. 6. The opaque spots of light filter element 54 are arranged to stop the zero order light transmitted by the imaged member 66, i.e., the non-diffracted light and the differently colored filter strips are arranged at the appropriate position to give a reproduction of the original image at output image plane 64. Where it is desired to obtain an image reproduction which is a color reproduction of the original image, filters of the complementary color of the color gratings must be used. For example, if the film is exposed through a color grating comprising cyan, magenta and yellow sets of strips then the readout illumination must be passed through red, green and blue filter strips to obtain that result.

The exposed film may also be reversal developed, i.e., the developed film will appear dark in the unexposed areas and similar results will be obtained as in the embodiment where the film is developed in the normal manner. It should also be noted that similarly to the embodiment described in FIG. 1. it is possible to obtain color positive-quasi color negative or color negative-quasi color positive image reproduction by selection of the appropriate color gratings and color filters.

It should be noted that any light sensitive recording material which will respond to wavelengths of light in at least two different color regions of the visible spectrum or a panchromatic light sensitive recording material may be used as an imaging member in the color image reproduction system illustrated in FIG. 6. For example, an imaging member comprising a substantially transparent photoconductive layer such as a 5–6 micron thick layer of poly-n-vinylcarbazole sensitized with 2,4,7-dinitro-9-fluorenone arranged on a transparent conductive substrate, electrically charged such as with corona charging means, brought into contact with a fiber optic element carrying a color grating and exposed to a multicolor original image through the fiber optic element. The image pattern formed on the surface of the imaging member can then be developed with electroscopic marking material by any electrophotographic developing technique to provide images in the form of gratings at different angular orientations. The imaged member could then be used in the system of FIG. 6.

Other imaging members which may be used in the system illustrated in FIG. 1 include those wherein the active element comprises a layer of a ferroelectric ceramic material. Such imaging members can generally be similar to that illustrated in FIG. 2 with the exception that the elastomer layer is replaced with a layer of a suitable ferroelectric material such as a piezoelectric material. For a more detailed description of piezoelectric materials useful in such an imaging member see the article entitled "Reflective-Mode Ferroelectric-Photoconductor Image Storage and Display Devices", *Applied Physics Letters*, Vol. 23, No. 2, 15 July, 1973. Other types of imaging members which may be used are frost and relief deformation imaging members. A typical frost or relief imaging member comprises a layer of a surface deformable material such as a thermoplastic resin overlying a photoconductive insulating layer which resides on a conductive transparent substrate. Again it is noted that any imaging member capable of recording screened color image input may be used.

Although the invention has been described with respect to various preferred embodiments thereof, it is not intended to limited thereto but rather those skilled in the art will recognize that variations and modifications may be made therein which are within the spirit of the invention and the scope of the claims. For example, the reproduction of the multicolor original image may be projected upon an apparatus capable of forming a hard copy reproduction thereof such as, for example, a color xerographic copier or the like.

What is claimed is:

1. A color image reproduction system comprising, arranged along an optical path an extended light source;

means for generating a plurality of point light sources;

means to project images of said point light sources at an image plane;

an imaging member comprising a substantially transparent first electrode carrying a layer of photoconductive insulating material which carries a layer of elastomer material which carries a flexible conductive metallic second electrode, a fiber optic element comprising a plurality of light conducting fibers secured together in side by side relationship so that corresponding opposite ends of said fibers cooperate to define first and second faces, one of said faces being adjacent the surface of said first electrode opposite that carrying said photoconductive layer, and means for applying an electrical field coupled to said electrodes, said imaging member bearing multicolor information comprising at least two images at different angular orientations and corresponding respectively to the color content of at least two different colors of an original multicolor image; and light filter means including selectively transmissive and substantially non-transmissive portions positioned at the image plane of said means for generating a plurality of point light sources for selectively transmitting to an output image plane the color content of the multicolor original image corresponding to the images recorded by the imaging member, wherein the images of said point light sources are in registry with said substantially non-transmissive portions.

2. The system as defined in claim 1 wherein said imaging member further includes a layer of a transparent insulating liquid over said second electrode.

3. The system as defined in claim 2 wherein said imaging member further includes on the face of said fiber optic element opposite that adjacent said first electrode color spatial light modulation means comprising at least two differently colored sets of stripes arranged at different angular orientations, each different set of stripes comprising alternating strips of colored areas and light transmitting areas.

4. The system as defined in claim 3 wherein said color spatial light modulation means comprises three differently colored sets of stripes.

* * * * *